United States Patent [19]

Kosheleff

[11] Patent Number: 4,487,176
[45] Date of Patent: Dec. 11, 1984

[54] ROTARY POSITIVE DISPLACEMENT MOTOR

[76] Inventor: Patrick A. Kosheleff, General Delivery, Big Pine, Calif. 93513

[21] Appl. No.: 402,975

[22] Filed: Jul. 29, 1982

[51] Int. Cl.³ .............................................. F02G 3/00
[52] U.S. Cl. ...................................... 123/204; 418/9
[58] Field of Search ............... 123/204; 418/3, 9, 97, 418/201

[56] References Cited

U.S. PATENT DOCUMENTS

| Re. 29,627 | 5/1978 | Weatherston | 418/9 |
| 715,221 | 12/1902 | Warren | 418/10 |
| 1,164,546 | 12/1915 | Neuland | 418/9 |
| 2,485,687 | 10/1949 | Bailey | 123/204 |
| 2,804,260 | 8/1957 | Nilsson et al. | 123/204 |
| 3,310,043 | 3/1967 | Gamage | 123/204 |
| 3,481,532 | 12/1969 | Fraser | 418/9 |
| 3,518,975 | 7/1970 | Schmidt | 123/204 |
| 3,693,601 | 9/1972 | Sauder | 123/204 |
| 3,863,610 | 2/1975 | Spinnett | 123/204 |

FOREIGN PATENT DOCUMENTS

| 1125445 | 2/1960 | Fed. Rep. of Germany | 418/9 |
| 1317 | of 1901 | United Kingdom | 418/9 |
| 840414 | 6/1981 | U.S.S.R. | 418/9 |

Primary Examiner—Michael Koczo

[57] ABSTRACT

A positive displacement rotary compound chamber motor comprises a piston rotor and a barrier rotor rotating cooperatively in a ported housing. The piston rotor has a compound piston which during rotation sweeps out a compound working chamber. The barrier rotor has a small piston which sweeps out a high pressure (HP) chamber. A flange on the piston rotor is the barrier for the HP chamber. All pistons mesh with recesses in the rotor assemblies. During operation, the HP chamber is filled with HP gas, which then expands in the compound chamber. A compound piston larger than the small piston achieves a high expansion ratio. A leakage path from the HP chamber to exhaust is blocked by the addition of an intermediate piston and its meshing intermediate recess.

4 Claims, 28 Drawing Figures

A-A

B-B

C-C

A-A  B-B

C-C

A-A

A-A

A-A

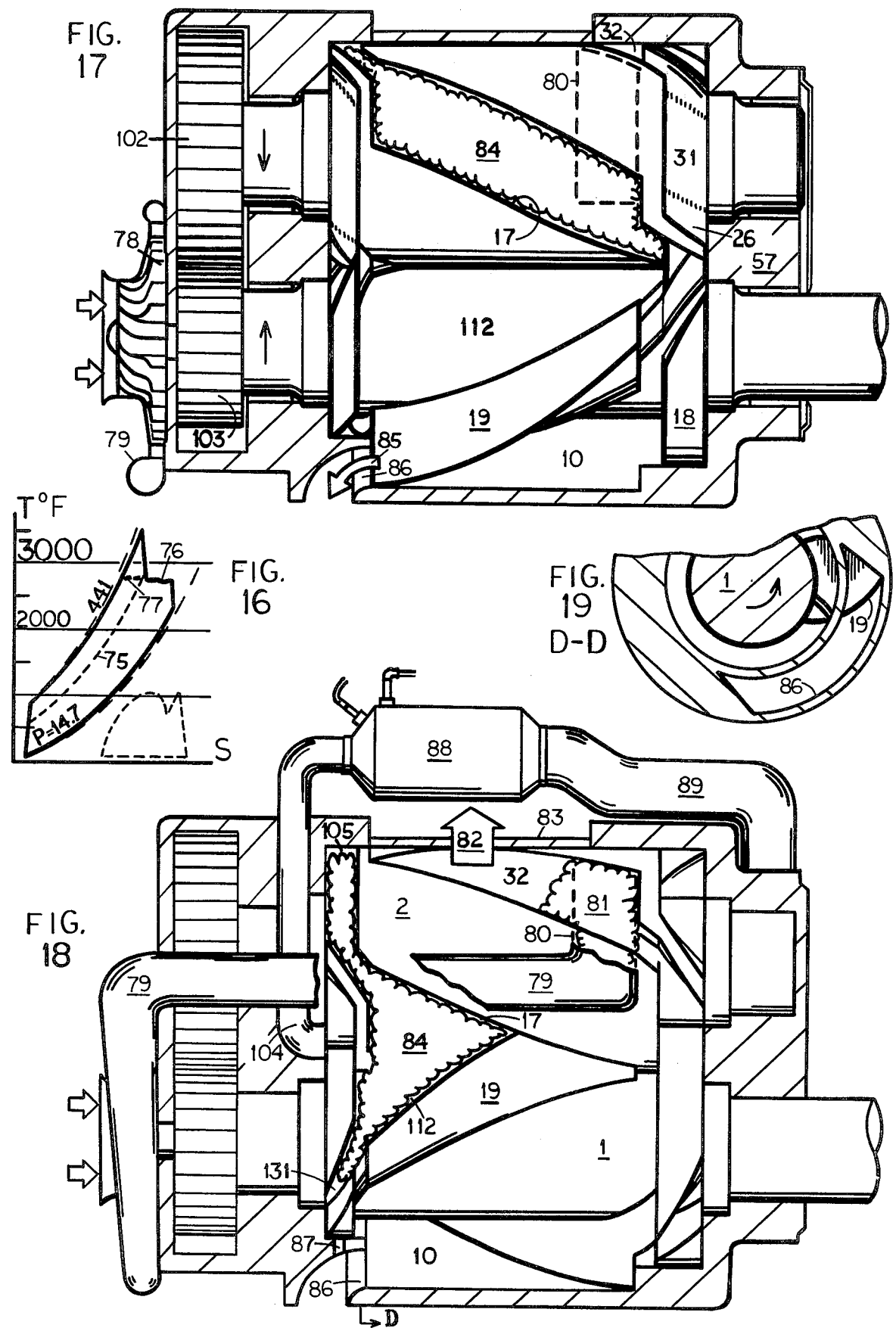

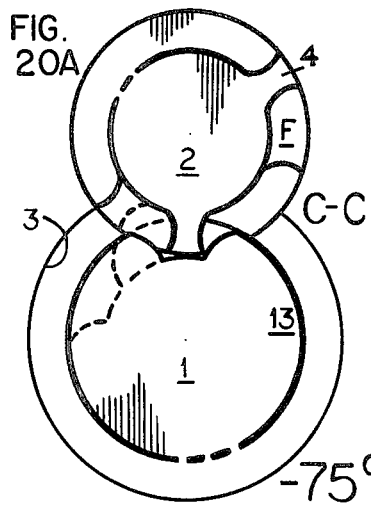
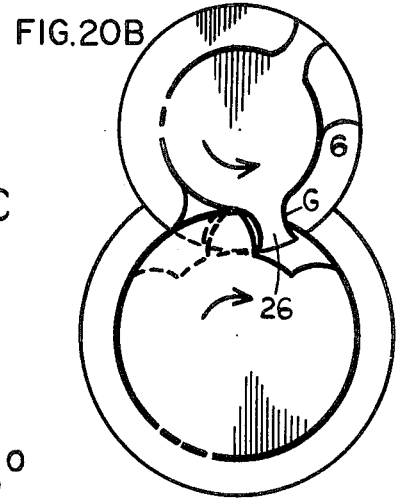
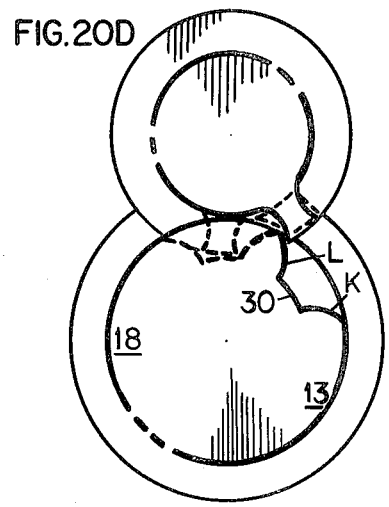
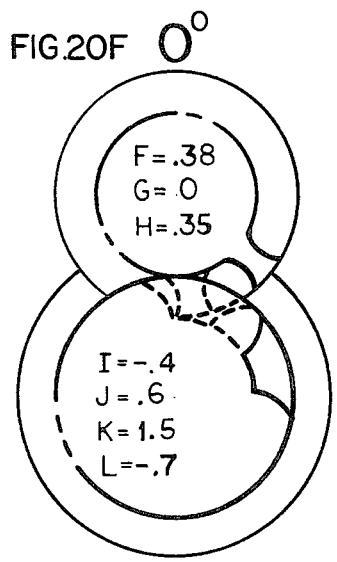
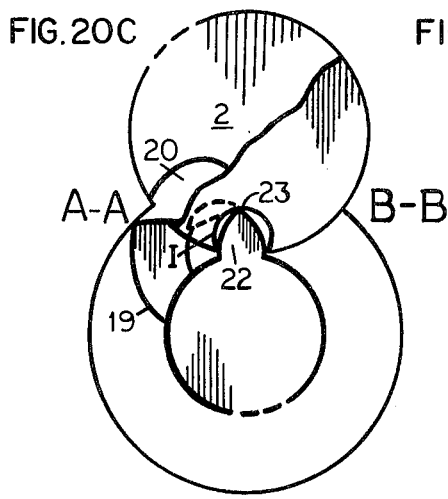
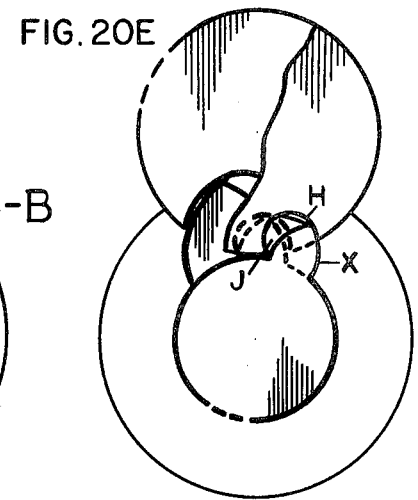
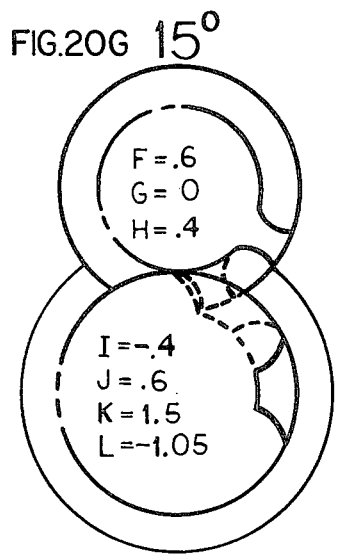
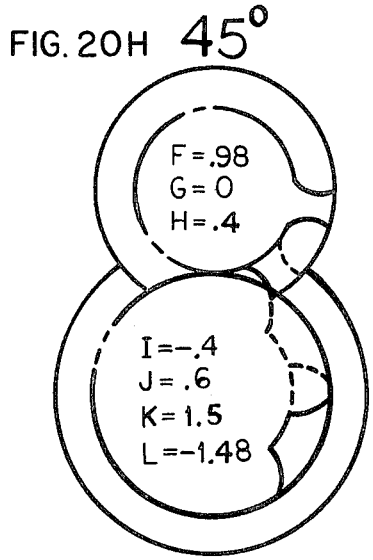
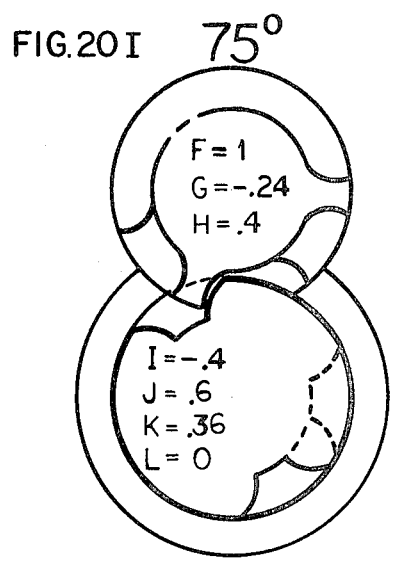

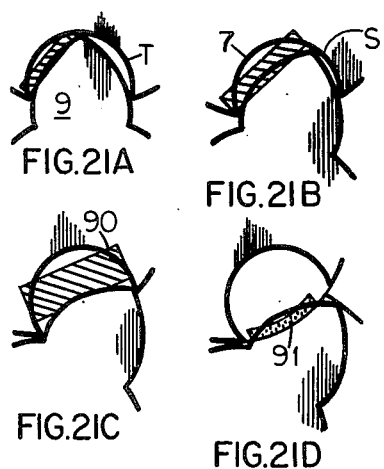
FIG.21A FIG.21B
FIG.21C FIG.21D
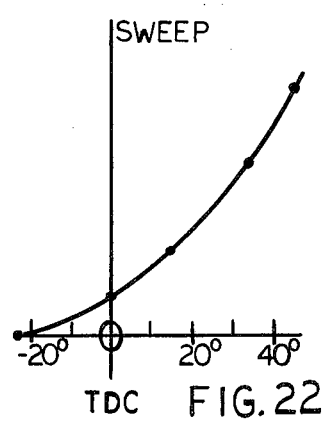
FIG.22
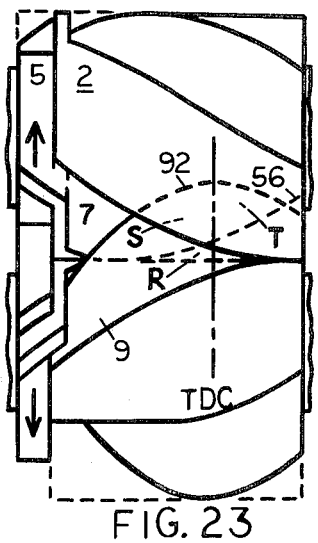
FIG.23
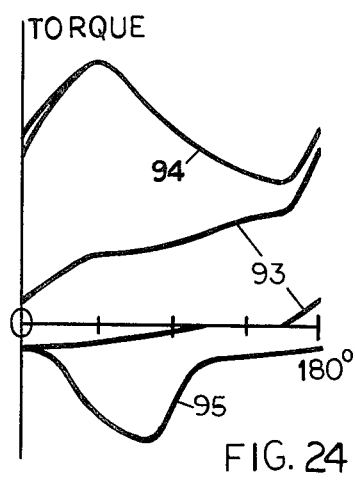
FIG.24
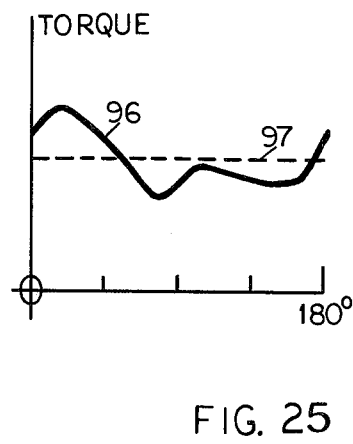
FIG.25
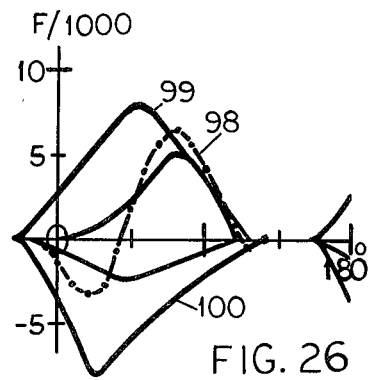
FIG.26
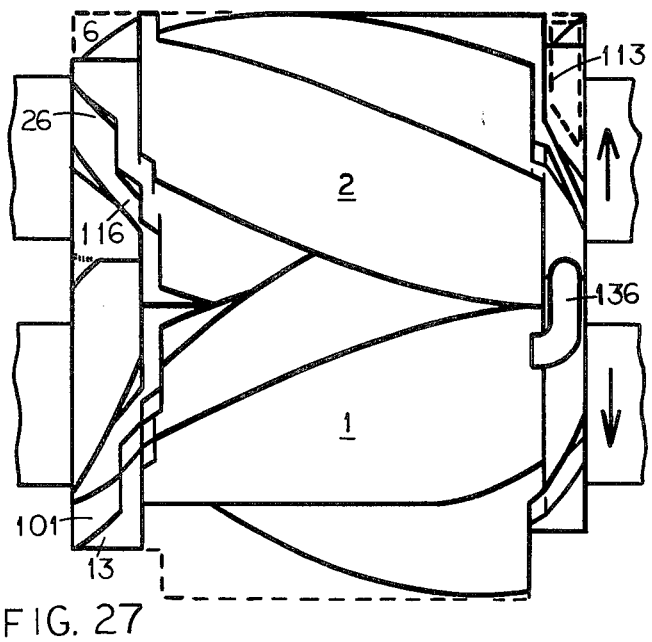
FIG.27
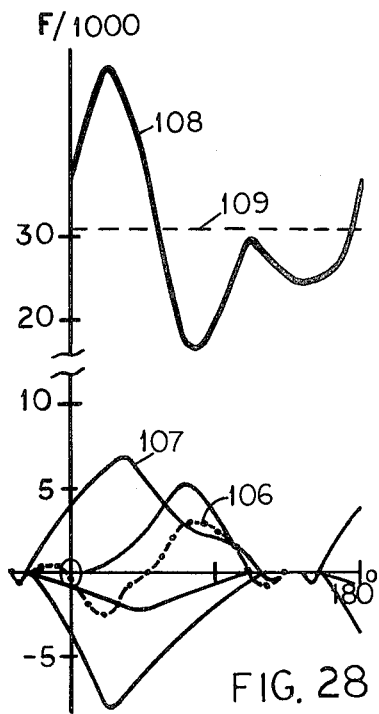
FIG.28

ROTARY POSITIVE DISPLACEMENT MOTOR

BACKGROUND OF THE INVENTION

1. The Field of the Invention is compound chamber rotary positive displacement motors with a high expansion ratio. Sub-fields of interest are, (a) an effective cooling system, (b) operation of the device as a compressor, (c) a compact power plant, and (d) unloading the timing gears from the gas forces.

2. Description of the Prior Art

Compound chamber rotary motors: U.S. Pat. No. 1,164,546 is for a rotary motor with serial expansion chambers. The high pressure (HP) chamber is axially spaced from the larger expansion chamber. The HP rotors have a long wrap helix. Great Britain Pat. No. 1317 is for a serial expansion motor whose HP rotors have groove-type HP chambers. Combining elements from the two devices gives a compound chamber motor somewhat like the present invention. U.S. Pat. No. 715,221 is a rotary motor with compound expansion chambers. A groove-type HP chamber feeds a larger expansion chamber from which it is separated by a rotating flange. There is no meshing channel in the gate rotor for the flange. U.S. Pat. No. Re. 29,627 and USSR Pat. No. 840,414 are compressors in which groove-shaped communication channels are carved out of the main bulk of one rotor. The other rotor has flanges meshing with the grooves. The grooves are not HP chambers. A rotary compressor with groove-type HP chambers is shown in "POWER", June 1977, pp. S-18 and 19. This device has undercut piston shapes. Cooling systems in rotary positive displacement devices: German Pat. No. 1,125,445 has passages through the housing apex where mesh begins, for spraying coolant at the hot parts. U.S. Pat. No. 3,518,975 mentions coolant injection passages through the water jacket. The cooling scheme proposes liquid jets "coordinated to the displacement chambers". U.S. Pat. No. 3,181,292 shows liquid streams released by the piston rotor upon one end of the hot piston faces. In French Pat. No. 1,175,287, liquid jets through piston recesses spray the hot parts.

Rotary motors with integral compressors: U.S. Pat. Nos. 2,485,687 and 3,188,800 are two examples, with screw rotors, exhaust gas scavenging, and air compression at the back of the motor.

SUMMARY OF THE INVENTION

A rotary positive displacement motor includes a piston rotor and a barrier rotor rotating cooperatively in a ported housing. A high pressure chamber for continuous intake of working gas is swept by a small piston. A compound piston on the piston rotor sweeps a compound chamber for useful expansion of the gas. The compound piston is larger than the small piston in order to secure a high expansion ratio. Recess means in the barrier rotor mesh with the compound piston during rotation. During mesh, the recess is divided into an expansion volume behind the piston and an exhaust volume ahead of it. The latter volume is a leakage path for a high pressure chamber, so intermediate piston and recess structures shorter than the compound piston are developped to block the leak.

A cooling system aims to control leakage through the rotating clearances by drastically limiting the heat expansion of parts. Water patches achieve convective cooling to the exterior of the pistons, the piston rotor, and the piston recesses in the barrier rotor. Other hot parts are convectively cooled from the outside by other applications of cooling liquid.

The rotary device operates as a compressor when rotation and flow are reversed. A compact power plant incorporates the compressor into the exhaust side of the motor, and exhaust gas scavenging means are added. NOx control by auxiliary air injection into an expanding rich combustion gas is shown. The net torque curve for the power plant is found to be equivalent to that of a 6-cylinder piston engine. Means to reduce the load on the timing gears are provided.

BRIEF DESCRIPTION OF THE DRAWING

FIG. 16 is a temperature-entropy diagram of the low—NOx cycle.

FIG. 17 is an elevation of exhaust scavenging in a power plant.

FIG. 18 is an elevation of compression in the power plant.

FIG. 19 is a cross sectional view (D—D) of the main exhaust port along cutting plane D of FIG. 18.

FIG. 20 is a 7-part progressive schematic cross sectional view of the high-pressure section of the motor, taken at cutting planes A, B or C.

FIG. 21 is a 4-part progressive schematic of recess volume expansion.

FIG. 22 is a graph of recess swept area during unmeshing.

FIG. 23 is an elevation of piston areas hidden during mesh.

FIG. 24 is a graph of motor and compressor gross torques.

FIG. 25 is a graph of net engine torque.

FIG. 26 is a graph of timing gear loading.

FIG. 27 is an elevation of alternative high pressure piston shapes.

FIG. 28 is a graph of reduced gear loading by the new piston shapes.

DESCRIPTION OF THE PREFERRED EMBODIMENT

Figure 1:
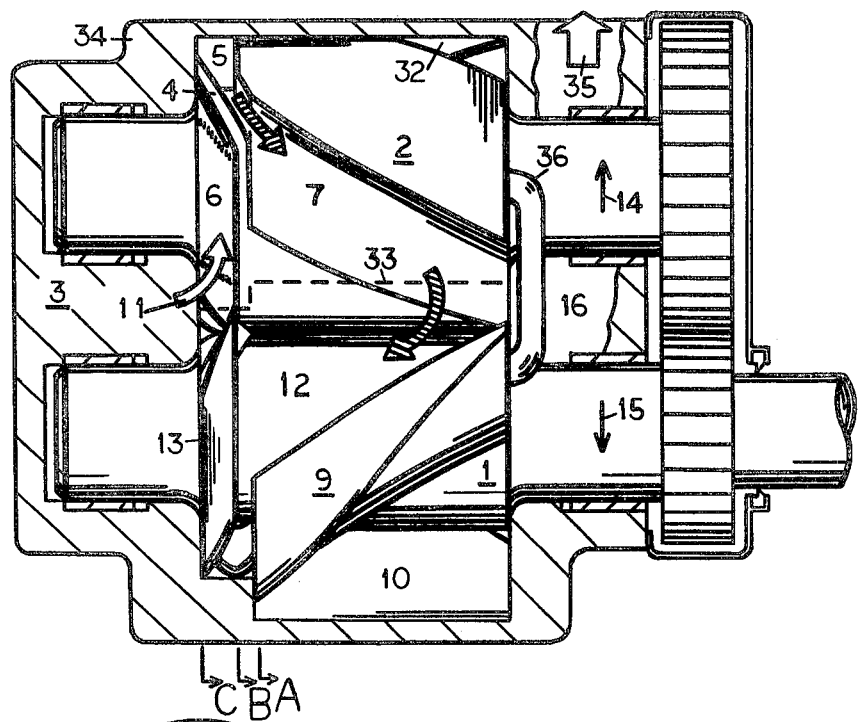
FIG. 1 is an elevation view of the interior parts of the rotary motor. The Figure includes generic cutting planes A, B, and C, along which several different sections are taken throughout the drawing.

The parts which make up the rotary motor are shown in FIG. 1. A piston rotor 1 and a barrier rotor 2 rotate oppositely in directions 14 and 15 within housing means 3. A small piston 4 interrupts groove 5 and sweeps out a high pressure chamber 6 (Numbers without leaders or underlines refer to the volume in which they are located.) Flange 13 is the barrier means for high pressure chamber 6. When multiple pistons are used, as in this device, there are several high pressure chambers. A source of high pressure gas 11 provides continuous flow into the chambers. The source of high pressure gas 11 is inlet port 21 of FIGS. 4 and 6. The dashed lines of inlet port 21 are its outline in phantom view since all of the housing has been removed fir visibility. Now return to FIG. 1. Work-producing expansion occurs when high pressure gas in chamber 5 expands into recess 7 from which piston 9 unmeshes. The flow of gas during expansion is shown by the two striped arrows. Expansion continues into compound chamber 12 which is swept by compound piston 9. Compound chamber 12 is bounded on the left by flange 13, at the top by barrier rotor 2, and on the right and bottom by compound piston 9. Taking a brief look at FIG. 2, compound chamber 12 would be the swept volume above compound piston 9. Expansion of the previous charge extends to compound chamber 10, which is larger than compound chamber 12. The high pressure gas now contained in high pressure chamber 6 will begin to expand when the next recess rotates into view, as in FIG. 27. Ultimately this gas will expand fully, following the route of striped arrows of FIG. 1, into the next compound chamber swept by the other compound piston. Recess 32 is shown in FIG. 17 communicating with high pressure chamber 31, of FIG. 4. Transfer tube 36 connects compound chamber 12 to recess 7 when the latter rotates past the intersection 33 of the compound chamber with housing top part 34.

During the final half rotation, expanded working gas 35 leaves through exhaust duct 16 shown at the back of the figure. The bilateral half 3 of the housing is considered to be the exhaust half of the housing; the near half has been removed for visibility. Transfer tube 36 is seen to obscure part of the rotor shafts on which rotation symbols 14 and 15 are found. Thus transfer tube 36 is associated with the removed near half of the housing. The last part of an exhaust phase can be seen in FIG. 2. Compound piston 19 when in mesh with recess 17 sweeps out a recess exhaust volume 20 ahead of the piston. Occasionally a distinction is made between the bilateral (left or right) halves of housing means 3, with reference to the sides of the figures they occupy. The left half of housing means 3 is referred to as the exhaust half because it covers the exhaust volumes of the motor and contains exhaust porting 16 of FIG. 1.

Figure 2:
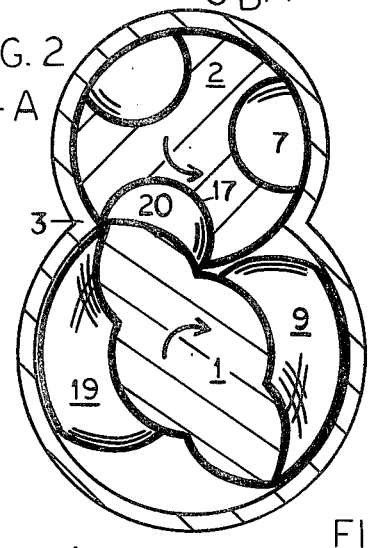
FIG. 2 (A—A) is a cross sectional view of the motor taken at generic cutting plane A.
Figure 3:
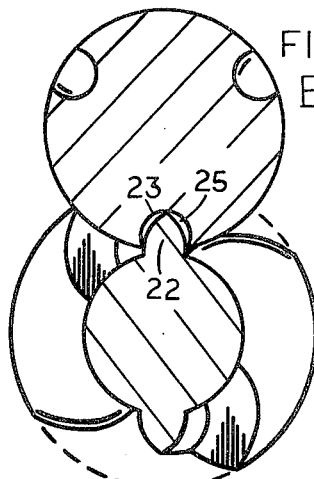
FIG. 3 (B—B) is a cross sectional view of the motor taken at generic cutting plane B.
Figure 4:
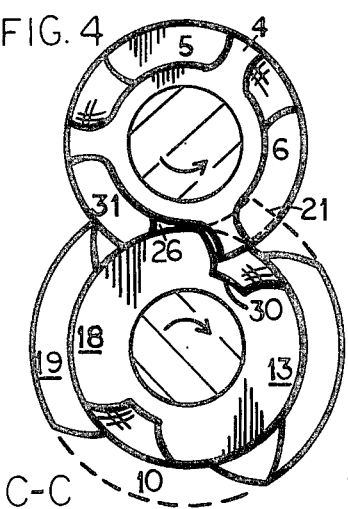
FIG. 4 (C—C) is a cross-sectional view of the motor taken at generic cutting plane C.

In FIGS. 3-6 the housing is omitted. New in the art are intermediate piston 22 and intermediate recess 23 of FIG. 3. These parts of small axial length lie to the right of cutting plane B in FIG. 1. The intermediate pistons, for example, which extend axially no farther than cutting plane A of FIG. 1, are wholly located between a flange, such as flange 13, and a compound piston such as compound piston 9. The problem which they solve is seen in FIGS. 2 and 4. In FIG. 2, the leading face of recess 17 has rotated to the right side of the device. This is also the side where high pressure chamber 6 is located. The volume ahead of compound piston 19 is recess exhaust volume 20. Because of the large diameter compound piston required for a high expansion ratio, volume 20 extends above flange 13 (of FIGS. 1 and 4) which is the sealing barrier for high pressure chamber 6. In the absence of the structure between cutting planes A and B, recess exhaust volume 20 would connect to high pressure chamber 6 of FIG. 4, causing leakage.

FIG. 3 is the layout of intermediate piston 22 of small height and meshing intermediate recess 23. The depth of recess 23 where it connects to high pressure chamber 6 (of FIG. 4) is the same as that of the chamber, which is abutted by flange 13. Flange 13 is connected to intermediate piston 22 and blocks the flow of gas from high pressure chamber 6 through intermediate recess volume 25 (of FIG. 3) to recess exhaust volume 20. The blocking mechanism works as follows. The right-hand-most face of flange 13 is at cutting plane B of FIG. 1, and, from FIG. 3, the left-most face of intermediate piston 22 is also at cutting plane B. Flange 13 and intermediate piston 22 are therefore contiguous. Then their meshing components, high pressure chamber 6 and intermediate recess 23, must also be connected together. The gas contained in high pressure chamber 6 could leak out through intermediate recess exhaust volume 25 of FIG. 3. However, it was stipulated earlier tht intermediate recess 23 be the same depth as high pressure chamber 6. Flange 13 meshes with high pressure chamber 6, so it extends radially as high as intermediate recess 23 is deep. Since flange 13 is contiguous to plane B—B of FIG. 3, it covers intermediate recess exhaust volume 25. This blocks the leakage path out of high pressure chamber 6. The same job could be done with a compound piston tapering to the height of flange 13.

Figure 5:
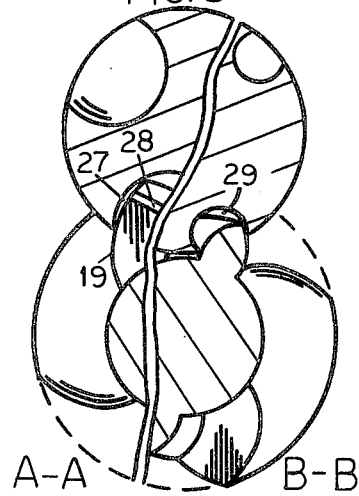
FIG. 5 (A—A, B—B) is a composite sectional view of the motor taken partly at cutting plane A and partly at cutting plane B. This view, and the next, are advanced 16 degrees of rotation over the previous figures.
Figure 6:
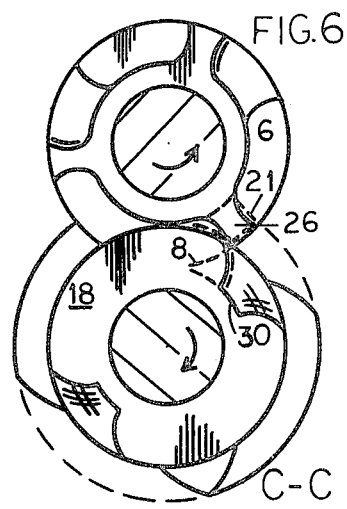
FIG. 6 (C—C) is a cross sectional view of the motor taken at cutting plane C.
Figure 9:
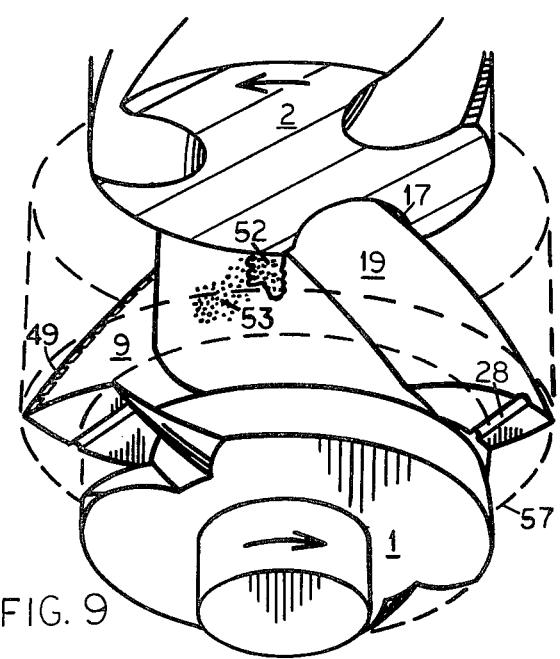
FIG. 9 is a three-quarters overhead composite view of the motor.

FIG. 4 establishes the connectedness of working volumes throughout rotation. The meshing of small piston 26 with notch 30 puts high pressure chamber 31 in communication with compound chamber 10. This action can be followed with the aid of FIGS. 20 and 17. In FIG. 20B, leading face G of small piston 26 is far away from its meshing face in the notch, so high pressure chamber 6 is in communication with the notch. Because of the symmetry of small piston 26 and its meshing notch, a similar thing happens on the exhaust side of the device. As seen in FIG. 20A, the notch is open on the left of the small piston to the volume swept by the small piston. This is the same volume as high pressure chamber 31 of FIG. 4. Turning next to FIG. 17, it is seen that the notch in flange 18 communicates with compound chamber 10. Thus, when high pressure chamber 31 is in communication with the notch on the exhaust side of the motor, it also communicates with compound chamber 10. High pressure chamber 31 is itself connected to recess 32 of FIG. 1. This line of communication takes over when recess 32 in FIG. 1 has rotated past transfer tube 36 formerly connecting it to compound chamber 10. FIGS. 5 and 6 are advanced 16 degrees of rotation beyond the previous Figures and show the end of filling high pressure chamber 6 with gas at the highest temperature and pressure. In FIG. 6, small piston 26 is closing off high pressure port 21, and flange 18 is closing off auxiliary high pressure port 8. Optional port 8 adds flow capacity for filling notch 30. Simultaneously, high pressure port 21 begins to feed the growth of a new high pressure chamber behind small piston 26. Another growing volume requiring attention, recess expansion volume 27, can be seen in FIG. 5. In order to avoid a later free expansion loss in volume 27, it is convenient to feed it high pressure gas through channel 28 formed in the end face of piston 19. Channel 28 is pressurized by intermediate recess expansion volume 29, which is in communication with high pressure chamber 6. When the intermediate piston unmeshes from its intermediate recess, as in FIG. 20E (bottom FIGURE), a gap opens up between the wall of the recess and the trailing face of the piston. Referring now to FIG. 9, the inner ends of channel 28 and of its twin channel 180 degrees away extend all the way to the trailing faces of the intermediate pistons. This puts channel 18 in communication with the gap. The volume with the gap in FIG. 20E, is the same as recess expansion volume 29 of FIG. 5. Volume 29 is in communication with notch 30 of FIG. 6, which is pressurized by auxiliary high pressure port 8. This finishes the description of the volumetric working of the motor. The following is a cooling system to drastically limit the heat expansion of the parts.

Figure 10:
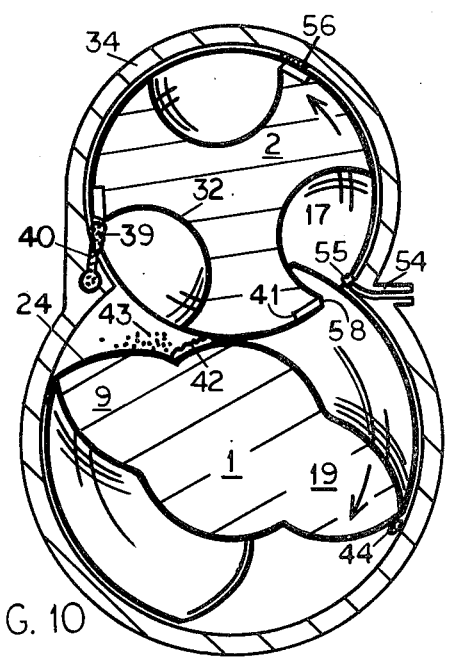
FIG. 10 (A—A) is a cross sectional view of the motor taken at cutting plane A. The rotation station is 150 degrees beyond FIG. 1.

The cooling system features positively applied liquid patches for cooling of the piston rotor assembly and some other moving parts. A typical cooling event is shown in FIG. 8, in which a jet of water 42 is applied against the hot trailing face 37 of compound piston 19. The beginning of a cooling cycle is seen in FIG. 10. Low-speed water duct 40 emits a blob of water 39 close to the interior surface of top part 34 of the housing as recess 32 rotates past. After continued rotation of barrier rotor 2, FIG. 7, blind passage 41 has collected water blob 43 and has carried it against trailing face 37 of compound piston 19. Duct 40 can also point downward to lessen the impact of collecting the water. Water blob 43 is following substantially trajectory 38 at nearly barrier rotor 2 rim speed, so it resembles a jet.

The intent is to keep the water jets in constant contact with the hot surfaces of the piston rotor. Such contact is not hard to achieve for compound piston 19 in FIG. 8, since its trailing face 37 is swept by the trailing edge of recess 17. Centrifugal force pushes more water 42 out of passage 41 and against trailing face 37, along new trajectory 48, to replace old water 43 still following trajectory 38 and which has drifted off trailing face 37. It may be useful to add aeration means 46 to the water circuit to get water blob 42 to bounce off the bottom of passage 41 for greater emptying velocity.

Once compound piston 19 has passed, FIG. 9, water patch 52 lands on piston rotor 1 and begins to cool it as the rotor rotates beneath. Spray 53 flies through the exhaust chamber, as in FIG. 8 where water spray 43 is the result of the curved path of the trailing edge of recess 17. Back in FIG. 9, the axial drift of water spray 53 will be sharply halted by collision with helical piston 9. This is splash cooling of the upper part of leading face 24 of piston 9, FIG. 10. The lower part of the leading face is cooled by splashing against water patch 42 at the end of the water patch's cooling run against piston rotor 1. Rotor cooling may be increased by the effect of aerator 46 of FIG. 8 reducing splatter. Recess trailing edge cutaway portions such as 58 are located at the openings of passages such as passage 41. In FIG. 8, the cutaway portion keeps cooling water 42 from entering recess expansion volume 27 where hot gas at high pressure would vaporize it faster. This concludes cooling of piston rotor components in the compound section.

Figure 7:
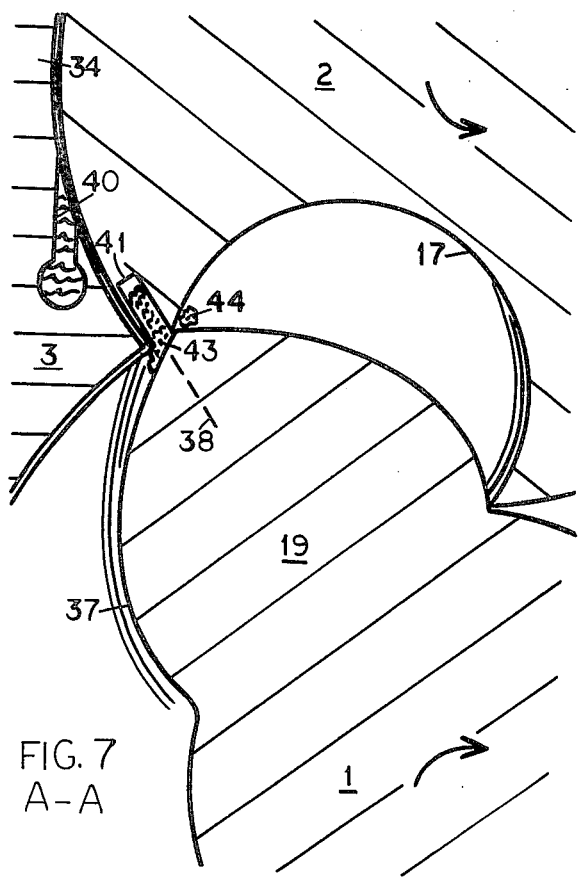
FIG. 7 (A—A) is a cross sectional view of the motor along plane A. The rotation station is the same as that in FIG. 1.
Figure 8:
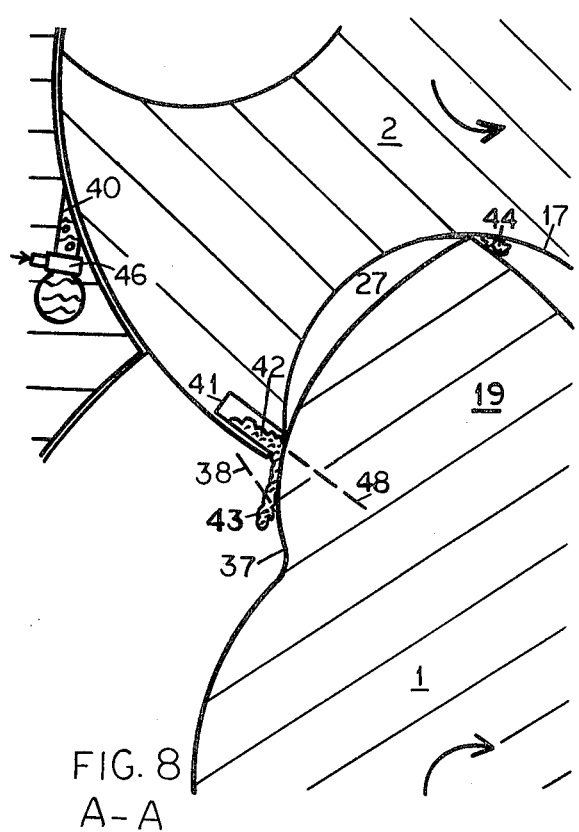
FIG. 8 (A—A) is a cross sectional view of the motor along plane A. The rotation station is some 32 degrees beyond figures 1 or 7.

Cooling of some other surfaces starts in FIG. 7. Duct 40 can be positioned so that jet 43 will be formed a little early and the tip of piston 19 will shear off a portion 44 to be pushed around the wall of recess 17. Recess 17 of FIG. 8 is being cooled in that manner. In order to retard axial drift of water blob 44 caused by the interaction of fluid rubbing friction and the helical pistons, it is convenient to carve a series of small cavities in the piston tips. The series of step-like cavities 49 is seen in FIG. 9. This Figure also incorporates the technique of representing the interior outline of housing means, e.g., hot half 57, by long dash lines. Bilateral half 57 of the housing is considered to be the hot half because it covers the expansion side of the motor. As a result of cavities 49, water blob 44 may not be squeezed out of a recess at the end of mesh. Instead, it can be dragged out of recess 17 and, in FIG. 10, pushed around the bottom part of the hot half of the housing in order to cool same. That leaves only barrier rotor 2 and top part 34 of the housing to be cooled in the compound section. In FIG. 10, duct means 54 are formed in the hot half of the housing, at or above the housing apex. Glob of water is emitted, to be struck by cutaway portion 58. A similar glob of water 56 from a previous cooling cycle is dragged around the interior of housing top part 34, thereby cooling it, and the water infiltrating the clearance between top part 34 and barrier rotor 2 cools the latter as well. This concludes cooling the parts to the right of cutting plane "A" in FIG. 1.

Figure 11:
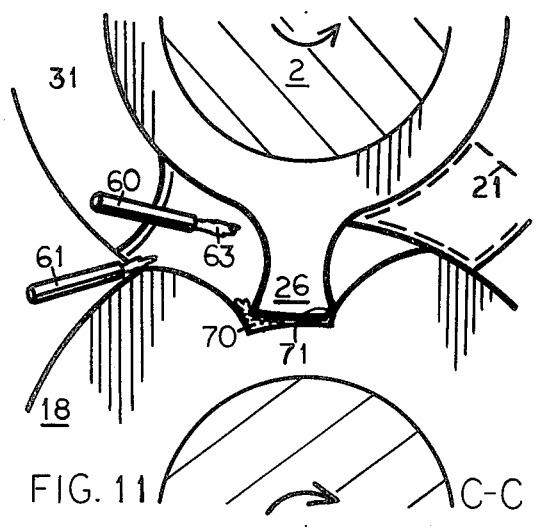
FIG. 11 (C—C) is a cross sectional view of the motor along cutting plane C. The rotation station is 30 degrees before FIG. 1.
Figure 12:
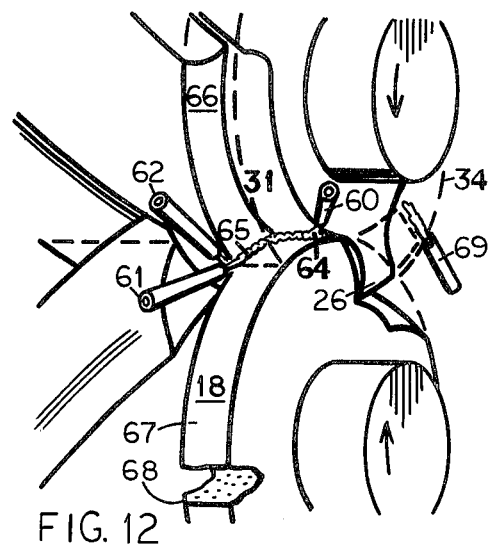
FIG. 12 is a ¾ rear view of high pressure chamber cooling.

The cooling situation for the parts to the left of cutting plane "A" is different. The pistons are smaller, and the typical cooling event looks the same for relatively long periods of time. In FIG. 11, two ducts 60 and 61 spout nearly continuous jets of water toward the intersections of flange 18 with groove 31. The application of the jets is covered in FIG. 12. Water glob 65 accumulates at the mesh line of flange 18 with the bottom of groove 31. Despite possible gas leakage through the clearance between the rotors, cooling can proceed because water blob 64 is being constantly replenished. Water line 65 scrubs the end face 66 of groove 31. The back face 67 of flange 18 can be cooled in a similar manner by the water issuing from duct 62. A small chamfer 68 can be cut in flange 18 to keep water line 65 more in place and save some cooling water. The end wall of housing top part 34 needs vigorous cooling because it is exposed to the highest convective heat transfer coefficients. Gases stream past continuously at the highest temperature and pressure. Accordingly, duct 69 shoots water onto the end wall where small piston 26 can mash it against the wall to generate a high level of heat-removing turbulence. Returning to FIG. 11, the "shadow" of relatively fast-moving small piston 26 as seen by relatively slow-moving jet 63 causes some cooling to be skipped, so that previous methods must be used. Water blob 70 corresponds to water blob 42 of FIG. 10; cutaway portion 71 has water passages like cutaway portion 58 of FIG. 10, and so on. This concludes cooling of the parts in the high pressure section of the motor.

Figure 13:
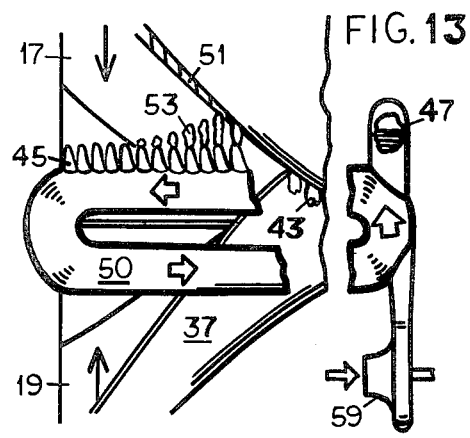
FIG. 13 is a side elevation view of a cooling water supply system.

A preferred embodiment of a water system adapted to manage the intermittent flow out of low speed ducts such as duct 40 is shown in FIG. 13. As before, compound piston 19 is being cooled as it meshes with recess 17 on the exhaust side of the turbine. A series of low-speed ducts 45 extending the length of the compound section is connected to a large, looped water main 50 fed by pump 59. The alignment of recess 17 with some of the low speed ducts allows water blob 53 to be emitted, to be collected by passage 51. Water blob 43 earlier collected is cooling trailing face 37 of compound piston 19. At this point, only water up to the arrow in the top leg of water main 50 has to be in motion. When the rotation of recess 17 uncovers duct 45, it too will emit a blob of water, and water along the whole length of water main 50 will be in motion. Water main 50 includes a bottom leg which closes the loop in order to preserve the kinetic energy of that motion. There remains a deceleration loss of that motion when, after some rotation, only the ducts at the right-hand side of the Figure are again emitting water. For that reason water main 50 is wide. A large mass slightly decelerated loses less kinetic energy than a small mass considerably decelerated. Accumulator 47 can force more water onto the hotter, right-hand end of trailing face 37 and is in fact necessary with a piston wrap angle of much less than 180 degrees.

In conclusion of motor cooling, the location of most of the cooling schemes on the exhaust side of the device is intended to limit the evaporation loss of coolant, so that most of it can be re-used. The main benefit of exterior liquid cooling, of course, is that heat expansion is greatly reduced by eliminating the usual large temperature drop through a coolant-containing wall. Finally, the scrubbing action of the cooling liquid on the metal parts can keep them free of ash deposits, should the motor be operated on the combustion of pulverized coal.

Figure 14:
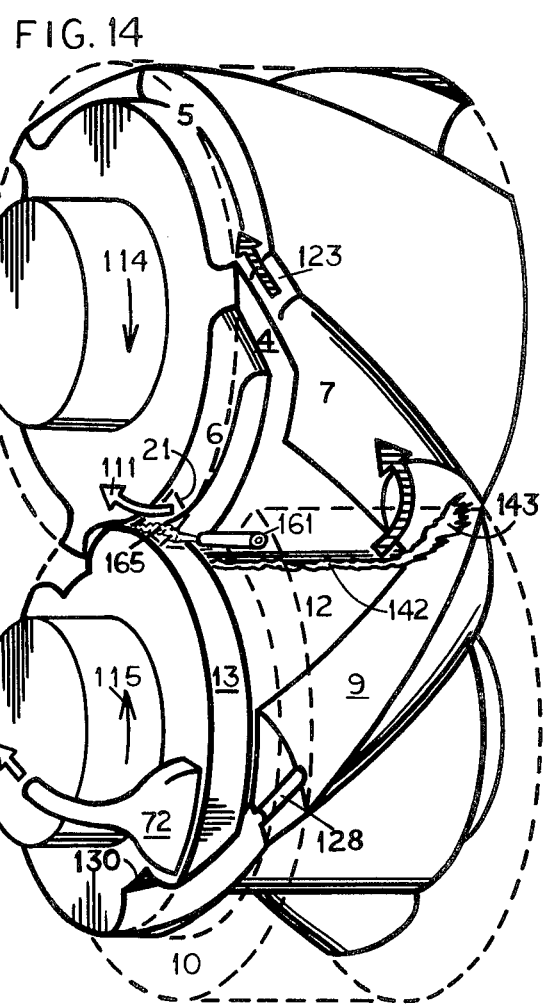
FIG. 14 is a ¾ front elevation of the device used as a compressor.

As with many other rotary devices, the motor becomes a compressor if rotation and airflow are reversed. Such a compressor is seen in FIG. 14. Some parts numbers are used as in FIG. 1 since the device is practically unchanged. The reversal of rotation is denoted by arrows 114 and 115, and the striped arrows have been reversed to indicate the airflow path from working chamber 12 through recess 7 and into high pressure chamber 5 during compression. From a previous compression, high pressure chamber 6 now delivers a stream 111 of compressed air through delivery port 21. Cooling of the hottest components, such as flange 13, the rotor surfaces of high pressure chamber 6, and small piston 4, is conveniently achieved on the high pressure side of the device because of the reversed rotation. Nozzle 161 supplies water puddle 165 for cooling these surfaces by exterior scrubbing. In this case high pressure cooperates with rubbing friction to drive the cooling water into the hot surfaces. At the end of delivery from high pressure chamber 6, cooling water 165 is exhausted through delivery port 21 by small piston 4 and can be recovered in a cyclone separator. Cooling of the compound section proceeds similarly to FIGS. 7–10, with water patch 142 cooling the rotors and water spray 143 cooling the leading face of compound piston 9. At the end of compression, relief duct 128 will direct the last of the high pressure gas trapped in the left-hand end of recess 7 to high pressure chamber 5 through intermediate recess 123. That scavenging is the reverse of the pressurization covered in FIG. 5. Cooling water 142 and 143 is presumably the last thing to be exhausted from recess 7 because of its high density compared to compressed gas. The water filling up relief duct 128 will reduce its free expansion loss by displacing the compressed air therefrom.

Figure 15:
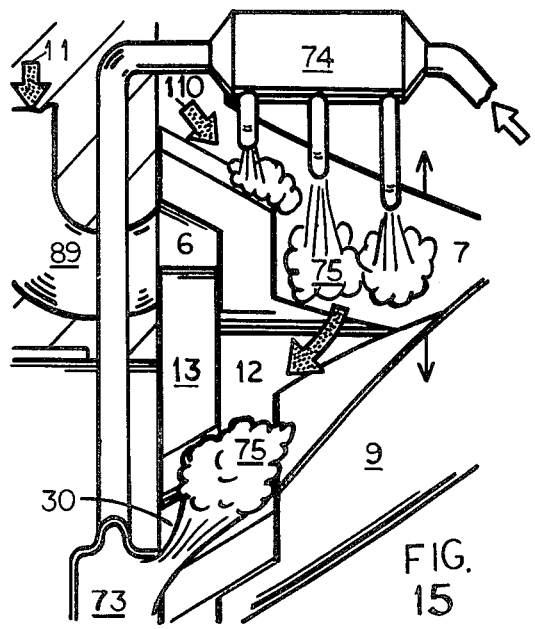
FIG. 15 shows NOx control by air injection into a rich mixture gas.

The rotation of notch 130 past medium-pressure port and collector 72 withdraws some air during the compression process. In a complete power plant including compressor, combustion chamber, and motor this air, if excluded from the initial combustion at high temperatures, can lead to a low level of nitric oxides. The motor for such a power plant is seen in FIG. 15. Rich mixture gas 11 from the combustion chamber enters motor supply pipe 89 and begins to fill high pressure chamber 6. Motor supply pipe 89 is actually associated with the housing and its high pressure gas inlet port, but since the hot half of the housing has been removed in order to see the parts, supply pipe 89 is shown as a separate entity. Partially expanded rich mixture gas 110 contained in the next high pressure chamber expands into recess 7 and compound chamber 12. About this time, notch 30 rotates into alignment with medium pressure air storage 73, and recess 7 uncovers pipes leading to another reservoir of medium pressure air storage 74. Medium pressure air 75, originating from collector means 72 of FIG. 14, is injected into the rich mixture gas 110 in order to continue or complete its combustion. The formation of nitric oxides is kept at a low level both by the original rich mixture combustion, and by the decreased gas temperature after expansion when more air is added.

FIG. 16 represents the previous thermodynamic cycle in a temperature-entropy diagram. In this constant-pressure heat addition cycle operating at a pressure ratio of 30:1, the combustion temperature is 3560 degrees F with about two thirds stoichiometric air, for an initial NO concentration of about 100 ppm in the rich mixture gas. Medium pressure air 75 is injected into this gas whose temperature has dropped through expansion. Wavy line 76 symbolizes the remaining, near-isothermal heat release due to the injected air as expansion proceeds in the vicinity of 2750 degrees F. The actual timing and temperatures of events may vary from those shown. For instance, a decrease in radiant heat transfer loss can be expected if more heat 77 is released at lower temperature. In that case, air injection requires high-pressure air and would occur at the beginning of expansion, or before if there is a mixing lag.

FIGS. 17–19 illustrate a compact power plant. This view shows the exhaust side of the motor. The bilateral half of the housing nearest the viewer has been removed, and hot half 57 now supporting the rotors has been left in place. In this embodiment, a compressor such as the one in FIG. 14 has been added to the motor, with the object of obtaining a complete power plant in a single set of rotors. The parts which comprise the compressor are readily identified. In FIG. 17, recess 17 corresponds to recess 7 of FIG. 14, compound piston 19 corresponds to compound piston 9 of FIG. 14, and compound chamber 112 corresponds to compound chamber 12 of FIG. 14. In FIG. 17, the small parts immediately to the left of recess 17, compound piston 19, and compound chamber 112 are the same as flange 13, notch 130, small piston 4, high pressure chambers 5 and 6, and intermediate recess 123 of FIG. 14. There is now a compressor like the one of FIG. 14 on the exhaust side of the motor.

Adding a compressor to the motor is known in the art. U.S. Pat. No. 2,485,687 discloses a rotary positive displacement motor with helical piston lobes and a compressor portion provided at the exhaust end of the device. In U.S. Pat. 2,485,687 as well as in the present embodiment, the essential components which transform the exhaust side of the motor into a compressor, are a scavenging blower and a scavenging port. In FIG. 17, these are blower 78, and scavenging port 80 whose dashed-line contour is part of the exhaust half of the housing, removed for visibility. These parts are designed to fill recess 17 with fresh charge 84. Air duct 79 of FIG. 18 conveys air from the blower to scavenging port 80.

The scavenging operation is like that of U.S. Pat. No. 2,485,687. In FIG. 18, blower air 81 enters recess 32 and displaces exhaust gas 82 from the recess and out through top exhaust port 83. Later, compound piston 19 encounters the fresh charge, such as blower air 84 from a previous scavenging. There is no difference between fresh charges 81 and 84, except that fresh charge 84 was the fresh charge 81 of an immediately preceding scavenge cycle. Compound piston 19 displaces some of fresh charge 84 out of compound recess 17 and into compound chamber 112. The main volumes of air being compressed, recess 17 and compound chamber 112, are the same as the volumes contained in recess 7 and compound chamber 12 of FIG. 14.

Compression, in FIG. 18, occurs when fresh charge 84 is pushed into second groove 105. The flow of air being compressed is the same as the striped arrows of FIG. 14, in which the fresh charge flowed into high pressure chamber 5. High-pressure air delivery 111 of FIG. 14 has its equivalent in delivery pipe 104 of FIG. 18. Compressed air flows through pipe 104 to combustion chamber 88, then through motor supply pipe 89. Delivery pipe 104 is to compressed air 111 of FIG. 14, as supply pipe 89 of FIG. 15 is to high pressure gas 11 of FIG. 1. A flow path is simulated as a component, the pipe, which isn't really there since the housing half has been removed for visibility.

The description now reviews the topic of exhaust scavenging. The motor was mechanically scavenged through exhaust porting 16 of FIG. 1. Similar to the motor, the compact power plant of FIG. 17 has mechanical scavenging of exhaust chamber 112. However, the compact power plant in addition has air scavenging 84 of recess 17. Scavenging air is understood to include fresh charge or any suitable gas except exhaust. The presence of scavenge air or fresh charge 84 is what ultimately turned exhaust chamber 112 into the intake chamber for the compressor. This follows the practice of U.S. Pat. No. 2,485,687. The end of scavenging is found in FIG. 19, where compound piston 19 has rotated to the edge of exhaust port 86. That point in time is the same as in FIG. 18, in which mostly fresh charge 84 remains in the trapped volume to be compressed, as in U.S. Pat. No. 2,485,687.

Two components in addition to those of U.S. Pat. No. 2,485,687 are useful for complete exhaust gas scavenging in the present embodiment. Auxiliary exhaust port 87 in FIG. 18 is the flow path to purge notch 131. Front exhaust port 113 of FIG. 27 can let exhaust gas out of high pressure chamber 105 of FIG. 18 before it is filled by fresh charge 84. Next is computation of gas loads affecting timing gears and torque, which must be smooth in a large power plant. The first item is the torque generated by the motor. Torque contributions originate both from the high pressure section and the compound section. The high pressure section will be considered first.

FIGS. 20A through 20I are a six-step schematic progression of events in the motor in which high pressure chamber 6, notch 30, and intermediate recess 23 are filled with high pressure, high temperature gas. The various parts are identified as in FIGS. 1–6. The six steps spread out from the rotation station of zero degrees (FIG. 20F) which is considered to be the top dead center position (TDC). At TDC, the tip of compound piston 19 (as for instance in FIG. 8) now points straight up. Torque components can be identified both in the piston rotor and the barrier rotor. Torque forces are the result of gas pressure on moving surfaces.

Surfaces contributing a positive during expansion are, face "F" of high pressure piston 4 and face "H" of intermediate recess 23 for the barrier rotor; and face "K" of flange 13 and face "J" of intermediate piston 22 from the piston rotor. Surfaces contributing a negative torque during expansion are, from the barrier rotor, face "G" of small piston 26 and face "I" of intermediate recess 23. From the piston rotor, only face "L" of flange 18 is negative. Face "X" of intermediate piston 22 when inside intermediate recess 23 is exposed to exhaust gas (see FIG. 3), and when outside recess 23 is considered to be a part of the compound section. Since the gas pressure in the high pressure section is at a uniform high value, it is only necessary to add up the contributions of the several surfaces algebraically and multiply by the pressure to obtain the net push for torque. A complete listing of the area values of the various surfaces is provided in FIGS. 20A through 20I. Included as the multiplication of the areas of the piston rotor surfaces by 1.5 to compensate for the 3:2 ratio timing gears through which the barrier rotor torque flows. The result of all computations is curve 93 of FIG. 24.

Turning now to the compound section, FIGS. 21–23, it is first necessary to compute the pressure of the working gas at each of many stations of the expansion. The first step is to chart the growth of the several volumes involved. Then they are combined; and lastly a thermodynamic chart is consulted which relates the increasing volume to the decreasing pressure. The first step begins in FIGS. 21A–21D in which the growth of the volume of compound recess 7 is plotted. It can be observed in this 4-part Figure that some volume is already swept at TDC (FIG. 21A) and that almost all the recess cross-section is vacated at 45° after TDC (FIG. 21D). It is adequate to chart the growth of the swept area graphically, as denoted by the shaded areas such as 90, instead of analytically. In the case of FIG. 21D, dotted area 91 denotes the recess area not yet swept clear. The recess swept area from the zero to maximum has been plotted as a function of compound piston angle in FIG. 22. Since compound piston 9 is helical, a range of piston wrap angle is equivalent to a certain piston length. The swept volume of the recess is then simply the swept area integrated over that length. The other type of volume to be considered is that of the compound chamber. In FIG. 23, compound piston 9, once clear of recess 7, sweeps out a compound chamber whose volume is easily determined from the cross-sectional area of the swept annulus, and the piston length. The combined volume of the compound chamber, recess 7 and high pressure chamber 5 is looked up on a thermodynamic chart which returns the pressure of the working gas. Next is the calculation of the exposed surfaces.

In FIG. 23, it is again found that exposed areas contributing to torque originate both in the piston rotor and in the barrier rotor. In the piston rotor the main torque-producing surface is the trailing face of compound piston 9, which, however, must be decremented by an area "R" which is shielded from working gas by the upturned trailing edge 56 of recess 7. Compound torque contribution of recess 7 in barrier rotor 2 is all negative. To the left of transverse cutting plane "TDC" lies a recess wall area "S" which is shielded from working gas by the edge 92 of compound piston 9. The existence of area "S", also seen in the FIG. 21B, means that recess 7 exerts a drag on rotation. To the right of cutting plane "TTC" of FIG. 23 lies a third shadow area "T" with an effect like that of area "S". Some of area "T" is visible in FIG. 21A. An algebraic accounting of all these areas, in a manner similar to that for the high pressure section, gives a net area to be multiplied by the pressure elsewhere arrived at in order to obtain the net force developped. The result of these calculations is the compound expansion curve 94 of FIG. 24. Curve 94 sits on top of high pressure section curve 93, so that the upper lines in the graph gives the net torque developd by the motor. The entire two sets of calculations are then repeated for the compressor part of FIGS. 17–19, and the results are total drag on torque 95 caused by the compressor.

FIG. 25 shows the net torque 96 developed by the complete power plant described in FIGS. 17–19. Net torque 96 is the algebraic sum of curves 94 and 95 of the previous Figure. The maximum torque of curve 96 is 1.40 times the mean torque 97, which makes the power plant about as smooth as a 6-cylinder piston engine.

The load on the timing gears is a matter of some concern. FIG. 26 shows the net load 98 in thousands of lbs on timing gears 102 and 103 of FIG. 17. Curve 98 is arrived at by isolating and combining the gas forces on the working surfaces of barrier rotor 2. Curve 99 is a subset of curve 93 of FIG. 24 and represents the forward push developped in high pressure chamber 5,6, or 31. Curve 99 comprises the torque contributions of areas "F", "G", "H", and "I" of FIG. 20. Curve 100 represents torque drag caused by areas "S" and "T" of FIG. 23 and is a subset of curve 94 of FIG. 24. Similar but smaller curves corresponding to the contributions of the compressor side are also included. The algebraic sum of all four curves is net gear load curve 98. The maximum force on the timing gears is some 6600 lbs. The unit load on the gears is calculated next. The power plant of FIG. 17 is operated without NOx control at a temperature of 4000 degrees F, for a cycle work of 516 BTU per lb of air. An output of 25,050 HP at 3600 RPM corresponds to an engine length of 10 feet. Timing gears 102 and 103 eleven inches wide would be unit loaded at up to 600 lbs per inch of face. This amount can be cut to less than half by the modifications in the next Figure.

In FIG. 27, a recessed portion 101 has been formed in the trailing face of flange 13's in order to accommodate a small piston 26 of increased angular extent. The effect of the protrusion of small piston 26 into high pressure chamber 6 is to carve out some of the down slope of curve 99. This chops the peak of curve 98. The second modification is the dogleg 116 which advances small piston 26 in the direction of rotation. Its effect is to shift curve 99 to the left. The combined effect of the two modifications gives new HP chamber torque contribution curve 107 of FIG. 28. The new net gear load curve is curve 106. The new peak loading of timing gears 102 and 103 eleven inches wide is approximately 277 lbs per inch of face. Timing gear life is considered next.

In a first approach, a service factor is calculated from the torque developped by the piston rotor 1 assembly alone. This torque is the sum of the remaining subsets of curves 93–95 of FIG. 24 and is represented by curve 108 of FIG. 28. The mean torque 109 of the piston rotor 1 assembly has been scaled to the required total gear force of 30,675 lbs required to transmit 21,087 HP at a pitch line velocity of 23,460 FPM. Piston rotor torque 108 resembles overall torque curve 96 of FIG. 25 but is more peaky, so that the ratio of the maximum torque to mean torque 109 of 1.62:1 places the piston rotor assembly in the category of a 5-cylinder piston engine driver. Following industrial practice, a service factor of 1.25 might be assigned. The flywheel effect of the load, which is likely not driven through the timing gears, may reduce the service factor to, say, 1.125. Gear life predictions could be based on 312 lbs unit load at a pitch line velocity of about 23,500 feet per minute.

In the second approach, screw compressors are used as a benchmark. The 312-lb unit load times eleven inches, the width of the timing gears, gives 3432 lbs which is 9.7% of the 35,237 lbs gear force required to transmit the 25,050 HP output of the power plant at a pitch line velocity of 23,460 FPM. This puts the power plant in the same class of rotating machines as round-lobe screw compressors, in which the power absorbed by the barrier rotor is 10–15 percent of overall shaft power. The durability of the timing gears can be expected to follow the standards of long life at full load already established by round-lobe screw compressors in industrial service. In conclusion, these encouraging results all derive from the fact that high pressure gas force on the small pistons in the barrier rotor tends to oppose working gas pressure on the compound piston recesses in the barrier rotor.

I claim:

1. A rotary positive displacement motor including a housing, a piston rotor, and a barrier rotor, in which
   a. said housing has parallel intersecting bores, a high pressure gas inlet port at one end of said bores, an exhaust port substantially at the other end of said bores,
   b. said piston rotor carries a compound piston which, during rotation, sweeps out a compound chamber in one said bore,
   c. said barrier rotor is located in the other said bore and includes a compound recess,
   d. said rotors rotating oppositely in timed relation for meshing of said compound piston with said compound recess,
   e. said piston rotor carrying a flange with a notch, said barrier rotor including a groove with small pistons, said flange meshing with said groove, said small pistons meshing with said notch,
   f. each said small piston during rotation sweeping out from said groove a high pressure chamber in communication with said inlet port for filling said high pressure chamber with said high pressure gas,
   g. said high pressure chamber after further rotation entering into communication with said compound recess swept by said compound piston, thereby beginning work-producing expansion,
   h. said compound recess, during said unmeshing from said compound piston, being connected to said compound chamber swept by said compound piston, in order to continue work-producing expansion,
   i. said compound piston having a greater diameter than said flange, so that said compound chamber is larger than said high pressure chamber, for larger expansion ratio,
   any piston, when in mesh, dividing its meshing recess into an expansion volume behind the rotation of said piston, and an exhaust volume ahead of the said rotation of said piston, k. said piston rotor carrying an intermediate piston between said flange and said compound piston, said barrier rotor including an intermediate recess connecting said groove to said compound recess, l. said intermediate recess where it connects to said groove being substantially no deeper than the height of said flange, m. said flange covering said exhaust volume of said intermediate recess to block leakage flow from said high pressure chamber, n. said compound piston after the end of said expansion sweeping and exhaust chamber which was formerly a compound chamber, said compound piston achieving mechanical purging of the exhaust gas in said exhaust chamber through said exhaust port.

2. The device of claim 1 including a. a second flange, a second notch, a second intermediate piston, a second groove, a second small piston, and a second intermediate recess, b. all said second items mounted on, or formed in, said rotor means substantially at the said end of said bores containing said exhaust port, c. said second intermediate piston located between said compound piston and said second flange, said second intermediate recess connecting said compound recess to said second groove, d. blower means to replace with fresh charge the exhaust gas in said compound recess when unmeshed from said compound piston, e. a delivery port substantially in said end of said bores containing said exhaust port, f. said compound piston when meshing again with said compound recess displacing said fresh charge from said compound recess and into said exhaust chamber, g. said compound piston trapping said fresh charge by rotating past said exhaust port, said compound piston upon further rotation squeezing said fresh charge into said second groove swept by said second small piston, h. said second groove being smaller in volume than said fresh charge and so constituting second high pressure chamber, i. the compressed fresh charge upon further rotation of said second small piston being delivered through said delivery port to heat addition means feeding said motor, j. said compound piston being one of a set of two or less sweeping said exhaust chamber, so that said mechanical purging displaces more exhaust gas from said exhaust chamber than does said fresh charge.

3. The device of claim 2, in which a. said high pressure gas inlet port admits partially combusted rich mixture to said high pressure chamber, b. medium pressure compressed air storage means subject to periodic replenishment, c. a first valve comprising said second flange, said second notch, and collector means to withdraw partially compressed air when aligned with said second notch, d. said first valve controlling said periodic replenishment, e. a second valve comprising said flange, said notch, and said storage means, f. said storage means when aligned with said notch dispensing some said partially compressed air into said compound chamber, g. said compound chamber being partially expanded at the time of said dispensing, so that the temperature of said partially combusted rich mixture has dropped through expansion, h. the continued combustion in said mixture caused by said dispensing of some said partially compressed air producing a reduced level of oxides of nitrogen.

4. The device of claim 1 in which a cooling system includes a. duct means into the said bore in which said barrier rotor rotates, said duct means emitting liquid into said bore when a said recess rotates by, b. the trailing edge of said recess including cutaway portion with openings for passages in said barrier rotor, c. said passages scooping up said liquid as said cutaway portion rotates past said duct means, d. said liquid emerging from said passages during mesh of said recess with its said piston, said liquid being applied to the trailing face of said piston for exterior convective cooling thereof.

* * * * *